UNITED STATES PATENT OFFICE.

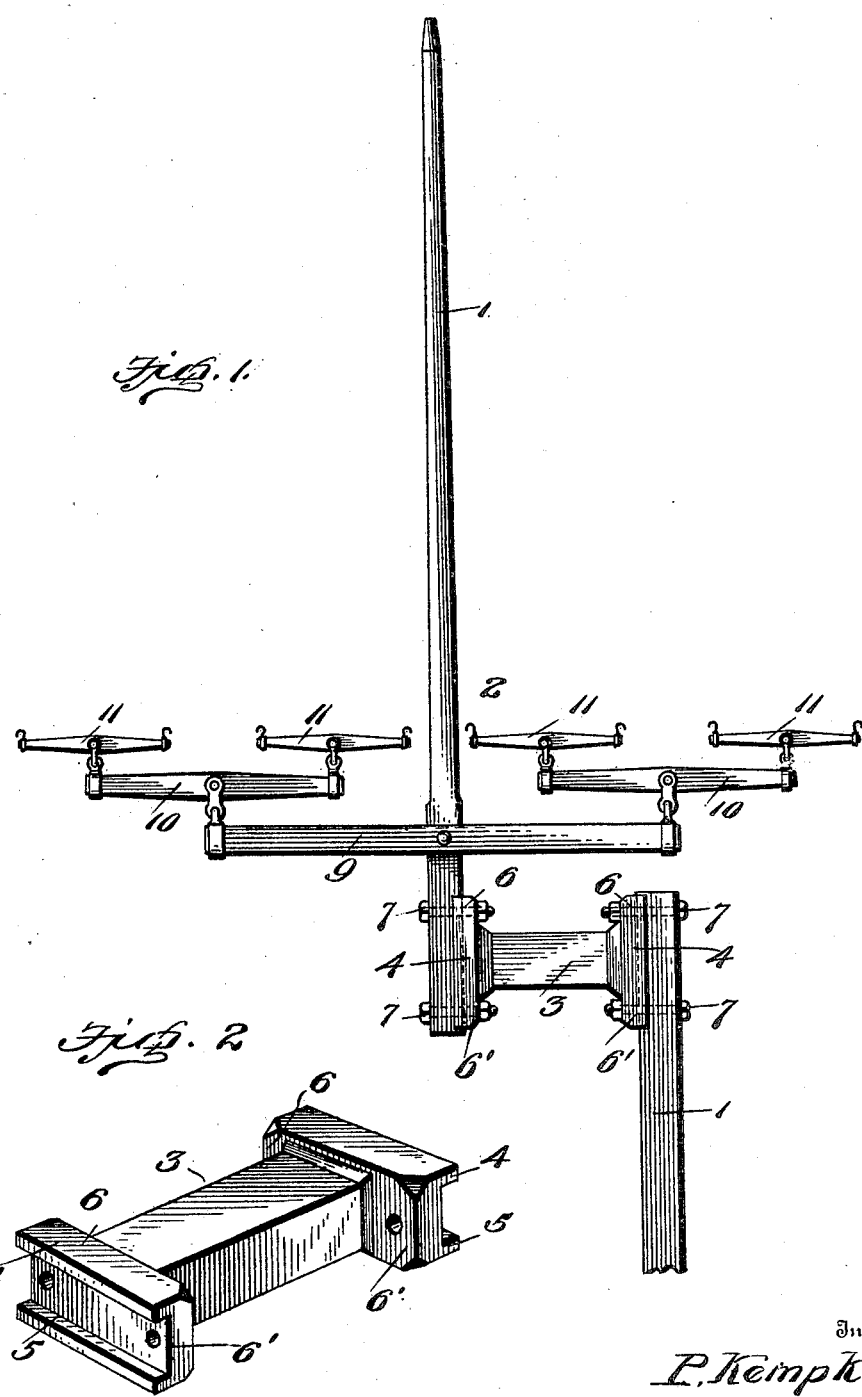

PETER KEMPKES, OF GARNER, IOWA.

DRAFT ATTACHMENT FOR BINDERS.

SPECIFICATION forming part of Letters Patent No. 678,741, dated July 16, 1901.

Application filed May 20, 1901. Serial No. 61,095. (No model.)

*To all whom it may concern:*

Be it known that I, PETER KEMPKES, a citizen of the United States, residing at Garner, in the county of Hancock and State of Iowa, have invented certain new and useful Improvements in Draft Attachments for Binders; and I do declare the following to be a full, clear, and exact description of the invention, such as will enable others skilled in the art to which it appertains to make and use the same.

The invention relates to draft attachments for binders or any other form of agricultural machine.

The object of the invention is to provide a device of this character which shall be simple of construction, durable in use, and comparatively inexpensive of production and by the employment of which four horses can be hitched to the main pole, two at one side thereof abreast and one on each side of the auxiliary pole, so as to tread the stubble side of the field rather than the grain side.

With this and other objects in view the invention consists of certain novel features of construction, combination, and arrangement of parts, which will be hereinafter more fully described, and particularly pointed out in the appended claim.

In the accompanying drawings, Figure 1 is a plan view of the forward end of the main pole, illustrating my improved draft attachment in place. Fig. 2 is a detail perspective view of the head-block for connecting the draft attachment to the pole.

Referring to the drawings, 1 denotes the forward end of the pole of a binder, reaper, or other agricultural machine, and 2 denotes my improved draft attachment, which consists of an auxiliary pole connected to the forward end of the pole 1 by a head-block 3. This head-block has upper and lower flanges 4 and 5 at each end to embrace the upper and lower sides of the main and auxiliary poles at their adjacent ends and are provided with forwardly and rearwardly projecting flanges 6 6' to receive two sets of bolts 7, one set of which extends through the forward end of the pole 1 and flanges 6, and the other set extends through the rear end of the pole 2 and the flanges 6', each set of bolts being provided with tightening-nuts. This construction is exceedingly simple, and it will be seen that by providing the flanges undue strain is taken off the bolts, thus producing a strong construction not apt to be affected by torsional strain and sudden jerks or jars. To the pole is pivoted a lever 9, which carries at its outer ends doubletrees 10, the ends of which support singletrees 11, two on each side of the pole 2.

From the foregoing description, taken in connection with the accompanying drawings, the construction, operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

The combination with the draft-pole for the purpose described, of a draft attachment, comprising an auxiliary pole equipped with a gang of singletrees and a laterally-disposed head-block having at one end two sets of flanges, one set for embracing the upper and lower sides of the auxiliary pole and the other set for embracing the upper and lower sides of the draft-pole, said flanges being provided with bolt-holes, and bolts passed through said holes and through the adjacent ends of the draft and auxiliary poles and provided with nuts, said head-block holding the draft and supplemental poles in parallel order, substantially as set forth.

In testimony whereof I have hereunto set my hand in presence of two subscribing witnesses.

PETER KEMPKES.

Witnesses:
M. R. CHAMBERS,
J. D. TRELL.